(12) United States Patent
Lach et al.

(10) Patent No.: US 7,632,883 B2
(45) Date of Patent: Dec. 15, 2009

(54) AQUEOUS SYNTHETIC RESIN PREPARATION

(75) Inventors: Christian Lach, Bad Duerkheim (DE); Michael Melan, Wachenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1208 days.

(21) Appl. No.: 10/494,444

(22) PCT Filed: Oct. 29, 2002

(86) PCT No.: PCT/EP02/12044

§ 371 (c)(1),
(2), (4) Date: May 3, 2004

(87) PCT Pub. No.: WO03/040241

PCT Pub. Date: May 15, 2003

(65) Prior Publication Data

US 2005/0014889 A1     Jan. 20, 2005

(30) Foreign Application Priority Data

Nov. 6, 2001  (DE) ................................ 101 53 932

(51) Int. Cl.
| C08K 5/07 | (2006.01) |
| C08K 5/04 | (2006.01) |
| C08K 3/26 | (2006.01) |
| C08J 3/00 | (2006.01) |

(52) U.S. Cl. ............... 524/359; 524/399; 524/400; 524/427; 524/556

(58) Field of Classification Search .............. 524/359, 524/399, 400, 427, 556
See application file for complete search history.

(56) References Cited

U.S. PATENT DOCUMENTS

| 4,265,796 A | * | 5/1981 | Mueller-Mall et al. | ...... 524/733 |
| 4,358,403 A | * | 11/1982 | Distler et al. | ............... 524/745 |
| 4,654,397 A | * | 3/1987 | Mueller-Mall et al. | ...... 524/460 |
| 5,162,415 A | * | 11/1992 | Rehmer et al. | ............... 524/359 |
| 6,566,472 B1 | * | 5/2003 | Baumstark et al. | ........... 526/263 |

FOREIGN PATENT DOCUMENTS

| EP | 0417568 | | 3/1991 |
| GB | 2109802 | | 6/1983 |
| GB | 2109802 A | * | 6/1983 |

* cited by examiner

Primary Examiner—David Wu
Assistant Examiner—Michael M Bernshteyn
(74) Attorney, Agent, or Firm—Oblon, Spivak, McClelland, Maier & Neustadt, L.L.P.

(57) ABSTRACT

An aqueous synthetic resin formulation essentially comprising a synthetic resin A, a metallic cation with a charge number of from 2 to 4, dispersants, water, and finely divided fillers, and also, if desired, acetophenone derivatives or benzophenone derivatives, the resin A being prepared by free-radically initiated aqueous emulsion polymerization of monomers in the presence of from 0.01 to 3 parts by weight of an alien polymer seed per 100 parts by weight of the monomer mixture.

12 Claims, No Drawings

AQUEOUS SYNTHETIC RESIN PREPARATION

BACKGROUND OF THE INVENTION

1. Field of the Invention

The present invention relates to an aqueous synthetic resin formulation essentially comprising A) from 3 to 75% by weight of at least one synthetic resin (resin A) composed of a) from 50 to 99.9% by weight of at least one ester of α,β-monoethylenically unsaturated carboxylic acids containing 3 to 6 carbon atoms and alkanols containing 1 to 18 carbon atoms or of at least one vinyl ester of an aliphatic monocarboxylic acid containing 2 to 8 carbon atoms, or of a mixture of these monomers (monomers a), b) from 0.1 to 12% by weight of at least one α,β-monoethylenically unsaturated monobasic or dibasic acid containing 3 to 8 carbon atoms, or anhydrides thereof, or of a mixture of these monomers (monomers b), c) from 0 to 10% by weight of one or more monoethylenically unsaturated acetophenone derivatives or benzophenone derivatives, or of a mixture of these monomers (monomers c), and d) from 0 to 50% by weight of one or more other copolymerizable monoethylenically unsaturated monomers (monomers d), in copolymerized form, the weight fractions of the monomers a, b, and d being chosen within the stated limits such that a synthetic resin composed only of these monomers would have a glass transition temperature of from −50 to +40° C.

B) at least one metallic cation with a charge number of from 2 to 4 in water-soluble form in an amount such that it is able to neutralize from 0.2 to 6 times the amount of its conjugate bases that corresponds to the amount of acid functions incorporated into the synthetic resin A in the form of the monomers b (component B), C) from 0 to 10% by weight, based on the resin A, of benzophenone or acetophenone or of one or more acetophenone derivatives or benzophenone derivatives which are not monoethylenically unsaturated, or of a mixture of these active substances (component C), D) an effective amount of a dispersant (dispersant D);

E) at least 5% by weight of water, and

F) from 0 to 85% by weight of finely divided fillers (filler F), with the proviso that the resin A is prepared by free-radically initiated aqueous emulsion polymerization of the monomers a to d in the presence of from 0.01 to 3 parts by weight of an alien polymer seed, based on 100 parts by weight of the mixture of the monomers a to d.

2. Description of the Background

Synthetic resin formulations corresponding to features A) to F) above, and their advantageous use as elastic coating materials, are described in EP-B 417568.

SUMMARY OF THE INVENTION

It is an object of the present invention to further improve the toughness of the elastic coating materials obtainable by the teaching of EP-B 417568.

DETAILED DESCRIPTION OF THE PREFERRED EMBODIMENTS

We have found that this object is achieved by the synthetic resin formulation defined at the outset.

Particularly suitable monomers a include esters of acrylic and methacrylic acid. Of particular importance in this context are the esters of methanol, ethanol, n- or iso-propanol, n-, iso- or tert-butanol, pentanols, 2-ethylhexanol, iso-octanol, n-decanol, and-n-dodecanol. Also suitable are vinyl esters, such as vinyl formate, vinyl acetate, vinyl propionate, and vinyl butyrate, among which vinyl propionate is particularly preferred.

Preferred monomers b include α,β-monoethylenically unsaturated monocarboxylic or dicarboxylic acids, such as acrylic acid, methacrylic acid, ethacrylic acid, itaconic acid, maleic acid, and fumaric acid, and their anhydrides. Further suitable monomers b include the monoamides of dicarboxylic acids such as maleic, fumaric and itaconic acid, and also the monoesters of these dicarboxylic acids with alcohols containing 1 to 18 carbon atoms. Additional suitable monomers b include vinylsulfonic acid, vinylphosphonic acid, acrylamidopropionic acid, and also acrylamidoglycolic acid and methacrylamidoglycolic acid. The resins A advantageously contain $\geq 0.5$ to 6% by weight of at least one of the monomers b in copolymerized form.

Preferred monomers c include those monoethylenically unsaturated acetophenone derivatives and benzophenone derivatives which are described explicitly as monomers c in EP-B 417568, page 3, line 39 to page 7, line 51. The resins A frequently contain from 0.1 to 2% by weight of the monomers c in copolymerized form.

Possible monomers d include monoethylenically unsaturated nitrogen compounds without carboxyl groups, such as acrylamide and methacrylamide, N-vinylformamide, N-vinylpyrrolidone, the amides of acrylic and methacrylic acid, and tetrahydrofurfurylamine, acrylonitrile and methacrylonitrile, and also ureido monomers, such as β-ureidoethyl acrylate, α-ureidoethyl vinyl ether, N-dimethylaminoethyl-N'-vinyl-N,N'-ethyleneurea, 1-(2-methacryloyloxyethyl) imidazolidin-2-one, and N-methacrylamidomethyl-N,N'-ethyleneurea. Further suitable monomers d include acrylic or methacrylic monoesters of diols, examples being 2-hydroxyethyl acrylate and methacrylate, 3-hydroxypropyl acrylate and methacrylate, and 4-hydroxybutyl acrylate and methacrylate, and also acrylic or methacrylic esters of tetrahydrofurfuryl alcohol. Likewise suitable as monomers d are vinylaromatic monomers, such as styrene or vinyltoluene, halogenated vinyl monomers, such as vinyl chloride or vinylidene chloride, unsaturated hydrocarbons, such as ethylene, propylene, isobutene, butadiene, and isoprene, and lower vinyl ethers. Suitable monomers d also include monomers containing two nonconjugated ethylenically unsaturated double bonds, such as the diesters of dihydric alcohols with α,β-monoethylenically unsaturated monocarboxylic acids, preferably acrylic and methacrylic acid. Examples of such monomers d containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate, and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. The amounts in which the polyunsaturated monomers d are used are preferably less than 5% by weight. Copolymerized monomers d advantageously include, in minor amounts up to 5% by weight, based on the resin A, silicon monomers, such as vinyltriethoxysilane, 3-methacryloyloxypropyltrimethoxysilane or vinyltris(2-methoxyethyl)silane, or else acrylate or methacrylate substituted by polyalkylene oxide. The total amount of the monomers d, copolymerized optionally into the synthetic resin A, is from 0 to 50% by weight, in particular from 0 to 35% by weight, based on the resin A.

Resins A advantageous in accordance with the invention are those whose monomer constituents a, b, and d are such that a synthetic resin composed only of the monomers a, b, and d has a glass transition temperature in the range from −50 to +40° C. Of particular interest are resins A whose monomer constituents a, b, and d are such that a synthetic resin composed only of the monomers a, b, and d has a glass transition temperature in the range from −40 to 0° C.

By the glass transition temperature is meant the limiting value of the glass transition temperature toward which this temperature tends with increasing molecular weight, in accordance with G. Kanig (Kolloid-Zeitschrift & Zeitschrift fur Polymere, vol. 190, page 1, equation 1). The glass transition temperature is determined by the DSC (differential scanning calorimetry, 20 K/min, midpoint measurement, DIN 53 765) method.

According to Fox (T. G. Fox, Bull. Am. Phys. Soc. 1956 [Ser. II] 1, page 123 and Ullmann's Encyclopädie der technischen Chemie, vol. 19, page 18, 4th edition, Verlag Chemie, Weinheim, 1980), the glass transition temperature, $T_g$, of copolymers with little or no crosslinking is given in good approximation by $$1/T_g = x^1/T_g^1 + x^2/T_g^2 + \ldots x^n/T_g^n,$$

where $x^1, x^2, \ldots x^n$ denote the mass fractions of monomers 1, 2, ... n and $T_g^1, T_g^2, \ldots T_g^n$ denote the glass transition temperatures of the polymers composed in each case of only one of the monomers 1, 2, ... n, in degrees Kelvin. The values of $T_g$ for the homopolymers of the majority of monomers are known and are listed, for example, in Ullmann's Encyclopedia of Industrial Chemistry, 5th Ed., vol. A21, page 169, Verlag Chemie, Weinheim, 1992; further sources of homopolymer glass transition temperatures are given, for example, in B. J. Brandrup, E. H. Immergut, Polymer Handbook, $1^{st}$ Ed., J. Wiley, New York 1966, $2^{nd}$ Ed. J. Wiley, New York 1975, and $3^{rd}$ Ed. J. Wiley, New York 1989).

The synthetic resin A is prepared by polymerizing the respective monomers in an aqueous medium under the known conditions of free-radically initiated aqueous emulsion polymerization in the presence of water-soluble free-radical initiators and dispersants D and regulators plus further auxiliaries [on this see, for example, Encyclopedia of Polymer Science and Engineering, Vol. 8, pages 659 to 677, John Wiley & Sons, Inc., 1987; D. C. Blackley, Emulsion Polymerisation, pages 155 to 465, Applied Science Publishers, Ltd., Essex, 1975; D. C. Blackley, Polymer Latices, $2^{nd}$ Edition, Vol. 1, pages 33 to 415, Chapman & Hall, 1997; H. Warson, The Applications of Synthetic Resin Emulsions, pages 49 to 244, Ernest Benn, Ltd., London, 1972; D. Diederich, Chemie in unserer Zeit 1990, 24, pages 135 to 142, Verlag Chemie, Weinheim; J. Piirma, Emulsion Polymerisation, pages 1 to 287, Academic Press, 1982; F. Hölscher, Dispersionen synthetischer Hochpolymerer, pages 1 to 160, Springer-Verlag, Berlin, 1969 and Patent DE-A 4003422].

In free-radical aqueous emulsion polymerization and also when assembling the synthetic resin formulation it is common to use dispersants D, which keep both monomer droplets and polymer particles in disperse distribution in the aqueous phase and so ensure the stability of the aqueous polymer dispersion produced. They include not only the protective colloids commonly used for conducting free-radical aqueous emulsion polymerizations, but also emulsifiers.

Examples of suitable protective colloids are polyvinyl alcohols, polyalkylene glycols, alkali metal salts of polyacrylic acids and polymethacrylic acids, cellulose derivatives, starch derivatives, and gelatine derivatives, or copolymers containing acrylic acid, methacrylic acid, maleic anhydride, 2-acrylamido-2-methyl-propanesulfonic acid and/or 4-styrenesulfonic acid, and the alkali metal salts of said copolymers, and also homopolymers and copolymers of N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides. A detailed description of further suitable protective colloids is given in Houben-Weyl, Methoden der organischen Chemie, volume XIV/1, Makromolekulare Stoffe, Georg-Thieme-Verlag, Stuttgart, 1961, pages 411 to 420.

It is of course also possible to use mixtures of emulsifiers and/or protective colloids. In many cases the dispersants used comprise exclusively emulsifiers, whose relative molecular weights, unlike those of the protective colloids, are normally situated below 1500. They may be anionic, cationic or nonionic in nature. Where mixture of surface-active substances are used, the individual components must of course be compatible with one another, and in case of doubt this can be checked by means of a few preliminary tests. Generally speaking, anionic emulsifiers are compatible with one another and with nonionic emulsifiers. The same applies to cationic emulsifiers, whereas anionic and cationic emulsifiers are usually mutually incompatible. An overview of suitable emulsifiers is given in Houben-Weyl, Methoden der organischen Chemie, volume XIV/1, Makromolekulare Stoffe, Georg-Thieme-Verlag, Stuttgart, 1961, pages 192 to 208.

Customary nonionic emulsifiers include, for example, ethoxylated mono-, di-, and tri-alkylphenols (EO units: 3 to 50, alkyl: $C_4$ to $C_{12}$) and also ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EO units: 3 to 8), Lutensol® AO grades ($C_{13}C_{15}$ oxo alcohol ethoxylates, EO units: 3 to 30), Lutensol® AT grades ($C_{16}C_{18}$ fatty alcohol ethoxylates, EO units: 11 to 80), Lutensol®. ON grades ($C_{10}$ oxo alcohol ethoxylates, EO units: 3 to 11) and Lutensol® TO grades ($C_{13}$ oxo alcohol ethoxylates, EO units: 3 to 20) from BASF AG.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 50, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Additional anionic emulsifiers have proven further to include compounds of the formula I

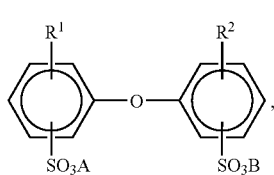
(I)

where $R^1$ and $R^2$ are hydrogen atoms or $C_4$- to $C_{24}$-alkyl but not both simultaneously hydrogen atoms, and A and B may be alkali metal ions and/or ammonium ions. In the formula I, $R^1$ and $R^2$ are preferably linear or branched alkyl radicals of 6 to 18 carbon atoms, in particular of 6, 12 or 16 carbon atoms, or hydrogen, but are not both simultaneously hydrogen atoms. A and B are preferably sodium, potassium or ammonium, with sodium being particularly preferred. Especially advantageous compounds I are those in which A and B are sodium, $R^1$ is a branched alkyl radical having 12 carbon atoms, and $R^2$ is a hydrogen atom or $R^1$. It is common to use technical-grade mixtures containing from 50 to 90% by weight of the monoalkylated product, such as Dowfax® 2A1 (brand of Dow Chemical Company), for example. The compounds I are common knowledge, from U.S. Pat. No. 4,269,749 for example, and are available commercially.

Suitable cationic emulsifiers are generally primary, secondary, tertiary or quaternary ammonium salts, containing a $C_6$- to $C_{18}$-alkyl, aralkyl or heterocyclic radical, alkanolammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. By way of example, mention may be made of dodecylammonium acetate or the corresponding hydrochloride, the chlorides or acetates of the various 2-(N,N,N-trimethylammonium)ethyl esters of paraffinic acids, N-cetylpyridinium chloride, N-laurylpyridinium sulfate, N-cetyl-N,N,N-trimethylammonium bromide, N-dodecyl-N,N,N-trimethylammonium bromide, N-octyl-N,N,N-trimethylammonium bromide, N,N-distearyl-N,N-dimethylammonium chloride, and the gemini surfactant N,N'-(lauryldimethyl)ethylenediamine dibromide. Numerous further examples can be found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989.

In particular, however, nonionic and anionic emulsifiers have proven appropriate as dispersants D.

In general from 0.05 to 10% by weight, frequently from 0.1 to 7% by weight, and often from 1 to 5% by weight of dispersant D, based in each case on the total amount of the ethylenically unsaturated monomers a to d, are used.

Suitable free-radical polymerization initiators include all those capable of triggering a free-radical aqueous emulsion polymerization. In principle they may comprise both peroxides and azo compounds. Also suitable, of course, are redox initiator systems. As peroxides it is possible in principle to use inorganic peroxides, such as hydrogen peroxide or peroxodisulfates, such as the mono- or di-alkali metal salts or ammonium salts of peroxodisulfuric acid, such as its mono- and di-sodium, potassium or ammonium salts, and organic peroxides, such as alkyl hydroperoxides, examples being tert-butyl, p-menthyl or cumyl hydroperoxide, and dialkyl or diaryl peroxides, such as di-tert-butyl or di-cumyl peroxide. Azo compounds used include importantly 2,2'-azobis(isobutyronitrile), 2,2'-azobis(2,4-dimethylvaleronitrile) and 2,2'-azobis(amidinopropyl) dihydrochloride (as V-50 from Wako Chemicals). Oxidants for redox initiator systems include substantially the abovementioned peroxides. As corresponding reductants it is possible to use sulfur compounds with a low oxidation state, such as alkali metal sulfites, examples including potassium and/or sodium sulfite, alkali metal hydrogen sulfites, examples including potassium and/or sodium hydrogen sulfite, alkali metal metabisulfites, examples including potassium and/or sodium metabisulfite, formaldehyde-sulfoxylates, examples including potassium and/or sodium formaldehyde-sulfoxylate, alkali metal salts, especially potassium and/or sodium salts, of aliphatic sulfinic acids, and alkali metal hydrogen sulfides, such as potassium and/or sodium hydrogen sulfide, for example, salts of polyvalent metals, such as iron(II) sulfate, iron(II) ammonium sulfate, and iron(II) phosphate, enediols, such as dihydroxymaleic acid, benzoin and/or ascorbic acid, and reducing saccharides, such as sorbose, glucose, fructose and/or dihydroxyacetone. In general the amount of free-radical polymerization initiator used, based on the total amount of monomers a to d, is from 0.1 to 5% by weight.

In order to adjust the molecular weight it is possible if desired to make additional use of molecular weight regulators which are known to the skilled worker and are commonly added in amounts of from 0.1 to 5% by weight, based on the total amount of the monomers a to d. Examples include alcohols, such as butenediol or iso-propanol, mercapto compounds, such as 2-mercaptoethanol or tert-dodecyl mercaptan, and haloform compounds, such as bromoform or chloroform.

Suitable reaction temperatures for the free-radical aqueous emulsion polymerization cover the entire range from 0 to 170° C. In general, temperatures from 50 to 120° C., frequently from 60 to 110° C., and often $\geq$70 to 100° C. are employed. The free-radical aqueous emulsion polymerization may be conducted at a pressure less than, equal to or greater than 1 bar (absolute), so that the polymerization temperature may exceed 100° C. and may be up to 170° C. Volatile monomers such as ethylene, butadiene or vinyl chloride are preferably polymerized under superatmospheric pressure. In this case the pressure may take on values of 1.2, 1.5, 2, 5, 10, or 15 bar or even higher. Where emulsion polymerizations are conducted under subatmospheric pressure, the pressures set are 950 mbar, frequently 900 mbar, and often 850 mbar (absolute). It is advantageous to conduct the free-radical aqueous emulsion polymerization under an inert gas atmosphere, such as under nitrogen or argon, for example.

The emulsion polymerization for preparing the resin A may be conducted either as a batch process or in the form of a feed process, including staged and gradient procedures. Preference is given to the feed process, in which, for example, a portion of the water, dispersant, polymerization initiator, and further auxiliaries is introduced as an initial charge and heated to the polymerization temperature and then the remaining amounts are supplied in the form of separate feed streams, of which one or more contain the entirety of the monomers a to d in neat or emulsified form, said feed streams being supplied continuously, in stages, or under a concentration gradient. The solids content of the aqueous starting dispersion obtainable in this way, containing at least one synthetic resin A, is preferably from 30 to 70% by weight and with particular preference from 45 to 65% by weight.

It is essential to the invention that the preparation of the resin A by free-radically initiated aqueous emulsion polymerization of the monomers a to d takes place in the presence of from 0.01 to 3 parts by weight, frequently from 0.02 to 2 parts by weight, and often from 0.04 to 1.5 parts by weight of an alien polymer seed, based on 100 parts by weight of the mixture of the monomers a to d.

A polymer seed is used particularly when the intention is to tailor the size of polymer particles being prepared by means of free-radical aqueous emulsion polymerization (on this see, for example, U.S. Pat. No. 2,520,959 and U.S. Pat. No. 3,397, 165).

In accordance with the invention, alien polymer seed particles are used whose size distribution is advantageously narrow and whose weight-average diameter $D_w$ is $\leq$100 nm, frequently $\geq$5 nm to $\leq$50 nm, and often $\geq$15 nm to $\leq$35 nm. Determining the weight-average particle diameters is familiar to the skilled worker and is done, for example, by the method of the analytical ultracentrifuge. For the purposes of this specification the weight-average particle diameter is the weight-average $D_{w50}$ figure as determined by the method of the analytical ultracentrifuge (on this cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

For the purposes of this specification a narrow particle size distribution exists if the ratio of the weight-average particle diameter $D_{w50}$ and number-average particle diameter $D_{n50}$ [$D_{w50}/D_{n50}$] as determined by the method of the analytical ultracentrifuge is $\leqq 2.0$, preferably $\leqq 1.5$, and with particular preference $\leqq 1.2$ or $\leqq 1.1$.

The alien polymer seed is normally used in the form of an aqueous polymer dispersion. The amounts indicated above refer to the polymer solids content of the aqueous alien polymer seed dispersion; they are therefore given as parts by weight of polymer seed solids based on 100 parts by weight of monomer mixture a to d.

In accordance with the invention, only one alien polymer seed is used. In contradistinction to what is known as an in situ polymer seed, which is prepared in the polymerization vessel before the actual emulsion polymerization is begun and which has the same monomeric composition as the polymer prepared by the subsequent free-radically initiated aqueous emulsion polymerization, an alien polymer seed is a polymer seed which has been prepared in a separate reaction step and whose monomeric composition is different from that of the polymer (resin A) prepared by the free-radically initiated aqueous emulsion polymerization, although this means nothing other than that the composition of the monomer mixtures used to prepare the alien polymer seed and, respectively, to prepare the synthetic resin A are different. The preparation of an alien polymer seed is known to the skilled worker and is normally carried out by charging a relatively small amount of monomers and a relatively large amount of emulsifiers to a reaction vessel and adding a sufficient amount of polymerization initiator at reaction temperature.

In accordance with the invention it is preferred to use an alien polymer seed having a glass transition temperature $\geqq 50°$ C., frequently $\geqq 60°$ C. or $\geqq 70°$ C., and often $\geqq 80°$ C. or >90° C. Particular preference is given to a polystyrene or polymethyl methacrylate polymer seed.

All of the alien polymer seed may be included in the initial charge to the polymerization vessel before the emulsion polymerization is commenced; an alternative option is to include only a portion of the alien polymer seed in the polymerization vessel before the polymerization is commenced and to add the remainder during the polymerization, or else to add all of the polymer seed in the course of the polymerization. Preferably, all of the alien polymer seed is included in the initial charge to the polymerization vessel before the polymerization is commenced.

In one preferred embodiment of the free-radically initiated aqueous emulsion polymerization, at least a portion of the water, of the alien polymer seed, and of the dispersants D is charged with stirring to a reaction vessel and the resultant reaction mixture is heated to reaction temperature under an inert gas atmosphere. At this temperature, any remainders of the water, of the alien polymer seed, and of the dispersants D, and also all of the free-radical polymerization initiators and monomers a to d, frequently in the form of aqueous monomer emulsions, are added discontinuously in one or more portions or over a relatively long period of time.

Suitable starting elements for metallic cations with a charge number of from 2 to 4 (component B) include, in particular, magnesium, calcium, aluminum, zinc, tin, cadmium, iron, cobalt, copper, nickel, titanium, manganese, vanadium, and zirconium, among which calcium and zinc are very particularly preferred.

The cations B are generally introduced into the aqueous synthetic resin formulations of the invention by incorporating—with stirring, for example—a compound containing the metallic component, in straight form or in solution in a suitable solvent, water or lower alcohols, for example, such as methanol, ethanol, iso-propanol, into an aqueous starting dispersion containing at least one synthetic resin A, preference being given to those compounds which possess good solubility in water. Examples of such compounds are the salts of organic or inorganic acids, such as the formates, acetates, sulfates, sulfites, nitrates or hydroxides. However, the oxides, carbonates, and hydrogen carbonates, which are less soluble in water, are also suitable, especially when they are incorporated into weakly acidic starting dispersions.

The amount of metallic cation B is calculated such that it is able to neutralize from 0.2 to 6 times, often from 0.5 to 2 times or from 0.7 to 1.5 times, and frequently 1 times the amount of its conjugate bases which corresponds to the amount of acid functions incorporated into the synthetic resin A in the form of the monomers b. Where, for example, the amount of acid functions in the resin A totals 1 mol and the cation B has a charge number of 2, the amount of cation compound B needed is at least 0.1 and not more than 3 mol. Where the cation B, however, has a charge number of 4, for example, the amount of cation compound B required in the aforementioned case is at least 0.05 and not more than 1.5 mol.

In general terms it is necessary to ensure that, on the one hand, the metallic components are not precipitated by auxiliaries added during the emulsion polymerization of resin A and, on the other hand, that the addition of the cation compound does not cause formation of coagulum in the aqueous dispersion. In order to prevent the precipitation of the metallic cation it is possible to use complexing agents. Examples of effective complexing agents include alkali metal salts of oxalic acid, tartaric acid, citric acid, pyrophosphoric acid or ethylenediaminetetraacetic acid, amino acids, such as alanine, glycine, valine, leucine, norleucine, N-methylaminoacetic acid, N-ethylaminoacetic acid, N-phenylaminoacetic acid, nicotinic acid or low molecular mass polyacrylic or polymethacrylic acids, and, with very particular preference, ammonia.

With advantage the cations B are added already in the form of salts of the aforementioned complex-forming acids (metal chelates). Further suitable metal chelates are metal acetylacetonates, such as Zn(II) acetylacetonate, Al(III) acetylacetonate, Cr(III) acetylacetonate or Ti(IV) acetylacetonate. Zinc (II) ions are introduced advantageously as aqueous ammonial Zn(II) ammonium hydrogen carbonate solution and calcium (II) ions advantageously in the form of calcium hydroxide [Ca(OH)$_2$] in solid form or in aqueous suspension, or in the form of the calcium/disodium salt of ethylenediaminetetraacetic acid, into the aqueous dispersion of the resin A.

It is essential that the addition of the cation compound B in complex form simultaneously lessens the tendency of the aqueous dispersion of resin A toward coagulation. Said coagulation may also be avoided, in particular, by using preferably nonionically or sterically stabilizing emulsifiers or protective colloids as dispersants D for preparing the aqueous dispersion of resin A. Another possibility of increasing the stability of the aqueous dispersion of resin A is to raise its pH to values from 6 to 12 by adding ammonia or amines, such as lower primary, secondary or tertiary alkylamines or cyclic amines, such as morpholine, for example, and also hydroxides, such as sodium or potassium hydroxide.

Suitable components C include all acetophenone derivatives and benzophenone derivatives which are not monoethylenically unsaturated, and which are explicitly described as component C in EP-B 417568, page 10, line 22 to page 11, line 2.

Component C is appropriately incorporated by stirring, preferably with heating, into an aqueous starting dispersion containing at least one synthetic resin A. From a performance standpoint, however, the copolymerization of monomers c into the resin A is preferred over incorporation of components C into the synthetic resin formulation of the invention, since copolymerization achieves a homogeneous distribution of the phenone compounds which is substantially independent of external influences, such as temperature, etc., and which is substantially retained even during and after the filming of the aqueous synthetic resin formulation of the invention.

The dispersants D used for assembling the synthetic resin formulation correspond essentially to the dispersants D used for the free-radically initiated aqueous emulsion polymerization.

The aqueous synthetic resin formulation contains at least 5% by weight of water. The aqueous synthetic resin formulations contain frequently $\geq 20\%$ by weight and often $\geq 30\%$ by weight of water. The synthetic resin formulations of the invention normally, however, contain water levels $\leq 60\%$ by weight.

As component F of the synthetic resin formulation of the invention use is advantageously made of aluminum silicates, quartz, precipitated or pyrogenic silica, which may have been hydrophobicized, light spar and heavy spar, talc, dolomite, calcium carbonate, barium sulfate, hornblend or wollastonite. Further suitable components F include color pigments. Examples of white pigments used include titanium white, lead white, zinc white, lithopones, and antimony white; examples of black pigments used include black iron oxide, manganese black, cobalt black, antimony black, and carbon black; and examples of chromatic pigments used include chromium yellow, red lead, zinc yellow, zinc green, zinc red, cadmium red, cobalt blue, Prussian blue, ultramarine, manganese violet, cadmium yellow, molybdate orange or strontium yellow.

The fillers F are normally employed in fine particle size. The average particle size is preferably from 0.5 to 200 μm. Alternatively, the fillers F may be used in the form of granules with an average size of from 0.1 to 10 mm, when using the formulation of the invention as a render, for example. As finely divided fillers it is also possible to use fibrous materials, such as cellulose fibers, polyacrylonitrile fibers or staple fibers of polyamide, for example. For the preparation of the synthetic resin formulation of the invention, the fillers F are generally incorporated by stirring as the last component into the synthetic resin dispersion already comprising components A to E.

Additionally, the formulation of the invention may include minor amounts of customary auxiliaries, such as preservatives, examples including chloroacetamide and benzothiazolinone, defoamers, based for example on esters of higher fatty acids, modified silicones or mineral oils, film formation assistants, examples including white spirit (boiling point 180 to 200° C.) or esters of glutaric, adipic, and succinic acid with iso-butanol, thickeners, based for example on cellulose ethers, such as methylcelluloses, hydroxyethylcelluloses or methylhydroxypropylcelluloses, or based on polyurethanes, pH buffers and water softeners, examples including alkali metal salts of polyphosphoric acids, leveling assistants, examples including polyethylene wax dispersions or diglycol di-n-butyl ethers, or pigment dispersants, such as alkali metal-salts or ammonium salts of polyacrylic acids with a number-average molecular weight of from about $10^4$ to $10^5$.

The pH of the finished aqueous synthetic resin formulation of the invention is preferably from 6 to 12, set appropriately using the same basic agents as for setting the pH of the aqueous dispersion of synthetic resin A.

The aqueous synthetic resin formulation of the invention is distinguished by the facts first that its surface tack during and after filming, particularly under the influence of actinic radiation, such as sunlight when used outdoors, decreases to an increased extent, thereby reducing the soiling tendency, and secondly that it exhibits increased toughness in the solidified state. Toughness here is understood as the product of tensile strength and elongation at break (both determined in accordance with DIN 53504), in a coating film produced from the synthetic resin formulation of the invention, measured in each case at 23° C. Actinic radiation is particularly influential if at least one monomer c was used for preparing the synthetic resin A or an acetophenone or benzophenone component C was used in assembling the synthetic resin formulation.

A further essential feature of the formulation of the invention is that its elasticity and its toughness in the solidified state are substantially retained over time under normal environmental conditions. Further, the films possess an increased water resistance.

The formulations of the invention are therefore especially suitable for coating, adhesively bonding, sealing or impregnating substrates of any of a wide variety of materials, such as woven textiles, fiberglass weaves, articles made from plastics such as polyvinyl chloride, polyvinylidene chloride, polystyrene, polyacrylonitrile or cellulose acetate, and also glass, metal, concrete, asbestos cement, stone, sand, steel, leather, wood, ceramic or slate.

It has also been found that the formulation of the invention is especially suitable as a coating material for walls, floors, and ceilings, as a marking paint for paths and roads, and as a render, and ensures improved and durable bridging of cracks.

EXAMPLES

1. Preparation of Synthetic Resins A and blending thereof with Components B and C Synthetic Resin Formulation A1

A 2 l polymerization vessel with stirrer and reflux condenser was charged with

---

225.0 g  of deionized water and
0.9 g  of an aqueous polymer latex (prepared by free-radically initiated emulsion polymerization of a monomer mixture composed of 97% by weight methyl methacrylate [MMA] and 3% by weight acrylic acid [AA]; polymer solids content 25% by weight) having a weight-average particle diameter $D_{w50}$ of 20 nm {seed latex 1},

--- and this initial charge was heated to 90° C. with stirring and under nitrogen. Then 2.3 g of feed stream II were added. Subsequently, still with stirring and maintenance of the reaction temperature, and beginning simultaneously, the remainder of feed stream II was metered continuously into the polymerization batch over the course of 150 minutes, 34 g of feed stream Ia as a first portion were metered continuously into the polymerization batch over the course of 30 minutes, and then the remainder of feed stream Ia as a second portion was metered continuously into the polymerization batch over the course of 120 minutes. At the same time as the second portion of feed stream Ia, feed stream Ib was started and was metered in continuously over the course of 105 minutes. After the end of feed stream II, reaction was allowed to continue at reaction temperature for 30 minutes more. The reaction mixture was then cooled to 60° C. and, beginning simultaneously, 15.0 g of a 10% strength by weight aqueous solution of tert-butyl hydroperoxide and also 14.3 g of a 13% strength by weight aqueous solution of acetone bisulfite (a 1:1 adduct of acetone and sodium hydrogen sulfite) were metered in continuously via two separate feed streams, over the course of 120 minutes. Subsequently, at 60° C., 20 g of a 10% by weight aqueous suspension of calcium hydroxide and 2.25 g benzophenone were stirred in. The reaction mixture was then cooled to 20-25° C. (room temperature) and filtered through a Perlon filter with a mesh size of 125 μm.

Feed Stream Ia is an Emulsion Prepared from:

| | |
|---|---|
| 149.0 g | of deionized water |
| 37.5 g | of a 30% strength by weight aqueous solution of the sodium salt of a $C_{12}$-$C_{14}$ alkyl ether sulfate (average degree of ethoxylation: 30) |
| 16.7 g | of a 45% strength by weight aqueous solution of Dowfax ® 2A1 |
| 11.3 g | of methacrylic acid (MAA) |
| 649.0 g | of n-butyl acrylate (nBA) |

Feed Stream Ib:

| | |
|---|---|
| 90.0 g | of acrylonitrile (AN) |
| 15.0 g | of deionized water |

Feed Stream II:

| | |
|---|---|
| 2.3 g | of ammonium peroxodisulfate |
| 42.7 g | of deionized water |

The resulting aqueous synthetic resin formulation A1 had a solids content of 59.7% by weight and a pH of 7.4.

Analysis

The solids contents were determined by drying an aliquot in a drying oven at 140° C. for 6 hours. Two separate measurements were carried out in each case. The figure given in the respective examples represents the mean of the two results.

The pH values were determined using a glass electrode and a Handylab1 pH meter from Schott, calibrated to buffers with pH values of 4.0, 7.0, and 9.0.

Synthetic Resin Formulation A2

Synthetic resin formulation A2 was prepared as for A1 except that the polymer latex used for A1 was replaced by 0.45 g of an aqueous polymer latex (prepared by free-radically initiated emulsion polymerization of styrene; polymer solids content 33% by weight) with a weight-average particle diameter $D_{w50}$ of 30 nm {seed latex 2}, included in the initial charge to the polymerization vessel.

The resultant aqueous synthetic resin formulation A2 had a solids content of 57.3% by weight and a pH of 7.5.

Synthetic Resin Formulation A3

A 2 l polymerization vessel with stirrer and reflux condenser was charged with

| | |
|---|---|
| 240.0 g | of deionized water and |
| 4.8 g | of aqueous seed latex 1 | and this initial charge was heated to 90° C. with stirring and under nitrogen. Then 1.4 g of feed stream II were added. Subsequently, still with stirring and maintenance of the reaction temperature, and beginning simultaneously, the remainder of feed stream II and all of feed stream Ia, added over the course of 120 minutes, and of feed stream Ib, added over the course of 105 minutes, were metered continuously into the polymerization batch. After the end of feed stream II the batch was cooled to 75° C. and reaction was allowed to continue for 60 minutes more. The reaction mixture was then cooled to 60° C. and, beginning simultaneously, 14.0 g of a 10% strength by weight aqueous solution of tert-butyl hydroperoxide and also 13.4 g of a 13% strength by weight aqueous solution of acetone bisulfite were metered in continuously via two separate feed streams, over the course of 120 minutes. Subsequently, 60 g of a 10% by weight aqueous suspension of calcium hydroxide and 2.1 g benzophenone were stirred in at temperature. The reaction mixture was then cooled to room temperature, admixed with 4.1 g of a 25% strength by weight aqueous solution of ammonia, and filtered through a Perlon filter with a mesh size of 125 μm.

Feed Stream Ia is an Emulsion Prepared from:

| | |
|---|---|
| 302.0 g | of deionized water |
| 35.0 g | of a 30% strength by weight aqueous solution of the sodium salt of a $C_{12}$-$C_{14}$ alkyl ether sulfate (average degree of ethoxylation: 30) |
| 15.6 g | of a 45% strength by weight aqueous solution of Dowfax ® 2A1 |
| 21.0 g | of AA |
| 595.0 g | of nBA |

Feed Stream Ib:

| | |
|---|---|
| 84.0 g | of AN |
| 28.0 g | of deionized water |

Feed Stream II:

| | |
|---|---|
| 1.4 g | of ammonium peroxodisulfate |
| 26.6 g | of deionized water |

The resulting aqueous synthetic resin formulation A3 had a solids content of 51.0% by weight and a pH of 7.6.

Synthetic Resin Formulation A4

Synthetic resin formulation A4 was prepared as for A3 but replacing the polymer latex used in A3 by 13.5 g of the aqueous seed-latex 2, included in the initial charge to the polymerization vessel.

The resultant aqueous synthetic resin-formulation A4 had a solids content of 48.9% by weight and a pH of 7.5.

Comparative Synthetic Resin Formulation C1

Formulation C1 was prepared as for formulation A1 but without using any seed latex.

The resultant aqueous comparative synthetic resin formulation C1 had a solids content of 60.9% by weight and a pH of 7.4.

Comparative Synthetic Resin Formulation C2

The formulation C2 was prepared as for formulation A1 but including no alien seed in the initial charge to the polymerization vessel, which instead was composed of

| | |
|---|---|
| 210.0 g | of deionized water and |
| 11.7 g | of a 30% strength by weight aqueous solution of the sodium salt of a $C_{12}$-$C_{14}$-alkyl ether sulfate (average degree of ethoxylation: 30), adding |
| 2.1 g | of feed stream II and |
| 4.1 g | of feed stream Ia | at 90° C., and carrying out initial polymerization for 10 minutes. Subsequently, with stirring and maintenance of the reaction temperature, and beginning simultaneously, the remainder of feed stream II was metered in continuously over the course of 150 minutes and 42.3 g of feed stream Ia as a first portion were metered in continuously over the course of 30 minutes, and then the remainder of feed stream Ia as a second portion was metered in continuously over the course of 120 minutes, to the polymerization batch. Simultaneously with the second portion of feed stream Ia, feed stream Ib was started and was metered in continuously over the course of 105 minutes. After the end of feed stream II, reaction was allowed to continue at reaction temperature for 30 minutes more. The reacton mixture was then cooled to 60° C. and, beginning simultaneously, 14.0 g of a 10% strength by weight aqueous solution of tert-butyl hydroperoxide and also 13.4 g of a 13% strength by weight aqueous solution of acetone bisulfite were metered in continuously via two separate feed streams over the course of 120 minutes. Subsequently, at 60° C., 18.7 g of a 10% by weight aqueous suspension of calcium hydroxide and 2.1 g of benzophenone were stirred in. The reaction mixture was then cooled to room temperature and filtered through a Perlon filter with a mesh size of 125 μm.

Feed Stream Ia is an Emulsion Prepared from:

| | |
|---|---|
| 382.0 g | of deionized water |
| 23.3 g | of a 30% strength by weight aqueous solution of the sodium salt of a $C_{12}$-$C_{14}$ alkyl ether sulfate (average degree of ethoxylation: 30) |
| 15.6 g | of a 45% strength by weight aqueous solution of Dowfax ® 2A1 |
| 10.5 g | of MAA |
| 606.0 g | of n-BA |

Feed Stream Ib:

| | |
|---|---|
| 84.0 g | of AN |
| 14.0 g | of deionized water |

Feed Stream II:

| | |
|---|---|
| 2.1 g | of ammonium peroxodisulfate |
| 39.9 g | of deionized water |

The resultant aqueous comparative synthetic resin formulation C2 had a solids content of 48.6% by weight and a pH of 7.3.

Comparative Synthetic Resin Formulation C3

Formulation C3 was prepared as for formulation A3 except that no seed latex was used and the amount of water in feed stream Ia was increased to 309 g.

The resultant aqueous comparative synthetic resin formulation C2 had a solids content of 51.1% by weight and a pH of 7.5.

Comparative Synthetic Resin Formulation C4

The comparative synthetic resin formulation C4 was prepared as for formulation A3, but including no alien seed in the initial charge to the polymerization vessel, which instead was composed of

| | |
|---|---|
| 240.0 g | of deionized water and |
| 11.7 g | of a 30% strength by weight aqueous solution of the sodium salt of a $C_{12}$-$C_{14}$ alkyl ether sulfate (average degree of ethoxylation: 30) adding |
| 1.4 g | of feed stream II and |
| 9.6 g | of feed stream Ia | at 90° C., and carrying out initial polymerization for 10 minutes. Subsequently, with stirring and maintenance of the reaction temperature, and beginning simultaneously, the remainders of feed stream II and feed stream Ia were metered in continuously over the course of 120 minutes and also all of feed stream Ib was metered continuously into the polymerization batch over the course of 105 minutes. Subsequent procedure was as for A3, except that feed stream Ia contained 309.1 g instead of 302.0 g of deionized water.

The resultant aqueous comparative synthetic resin formulation C4 had a solids content of 50.6% by weight and a pH of 7.5.

2. Performance Properties a) Preparation of the Paint Formulation

The aqueous synthetic resin formulations A1 to A4 and also the comparative synthetic resin formulations C1 to C4 were formulated to elastic coatings as follows:

$a_1$) Preparation of a Pigment paste

A pigment paste was blended at room temperature from the ingredients indicated in the table below. The individual ingredients were added to the blend in the order stated.

| Ingredient | Parts by weight [g] |
|---|---|
| Water | 170.0 |
| Ethylene glycol | 82.3 |
| Pigment dispersant[1] | 13.3 |
| Tetrapotassium pyrophosphate | 2.7 |
| Defoamer[2] | 10.6 |
| Pigment[3] | 185.9 |
| Calcium carbonate[4] | 784.3 |
| Zinc oxide[5] | 66.4 |

Products used:
[1] Tamol ® 850, Rohm and Haas Corp., USA
[2] Nopco ® NXZ, Cognis Deutschland GmbH, DE
[3] Ti-Pure ® R-960, E.I. Du Pont de Nemours, USA
[4] Atomite ®, Imerys, FR
[5] XX 503 515, Eagle Zinc Corp., USA The ingredients were mixed at high speed in a stirrer for 15 minutes and the paste obtained was used as a basis for the further formulation of the paint.

$a_2$) Formulation of Elastic Coatings $a_{21}$) Coating having a Pigment volume Concentration (PVC) of 37%

Crack bridging masonry coatings F1 to F4 with a PVC of 37% were blended at room temperature from the ingredients indicated in the table below. The individual ingredients were added to the blend in the order stated.

| Ingredient | Paint formulations; parts by weight [g] | | | |
|---|---|---|---|---|
| | F1 | F2 | F3 | F4 |
| Pigment paste $a_1$) | 240.0 | 240.0 | 240.0 | 240.0 |
| Emulsifier[6] | 2.5 | 2.5 | 2.5 | 2.5 |
| Formulation A1 | 193.0 | | | |
| Formulation A2 | | 201.0 | | |
| Comparative formulation C1 | | | 189.2 | |
| Comparative formulation C2 | | | | 237.0 |
| Defoamer[2] | 0.4 | 0.4 | 0.4 | 0.4 |
| Biocide[7] | 0.8 | 0.8 | 0.8 | 0.8 |
| Thickener[8] | 1.2 | 1.2 | 1.2 | 1.2 |
| Water | 62.1 | 54.1 | 65.9 | 18.1 |

Products used:
[6] Triton ® X-405, Rohm and Haas Corp., USA
[7] Skane M-8, Rohm and Haas Corp., USA
[8] Natrosol ® 250HR, Hercules Inc., USA $a_{22}$) Coating having a Pigment volume Concentration of 31%

Crack bridging masonry coatings F5 to F8 with a PVC of 31% were blended at room temperature from the ingredients indicated in the table below. The individual ingredients were added to the blend in the order stated.

| Ingredient | Paint formulations; parts by weight [g] | | | |
|---|---|---|---|---|
| | F5 | F6 | F7 | F8 |
| Pigment paste $a_1$) | 200.0 | 200.0 | 200.0 | 200.0 |
| Emulsifier[6] | 2.5 | 2.5 | 2.5 | 2.5 |
| Formulation A3 | 265.6 | | | |
| Formulation A4 | | 277.0 | | |
| Comparative formulation C3 | | | 265.1 | |
| Comparative formulation C4 | | | | 267.7 |
| Defoamer[2] | 0.4 | 0.4 | 0.4 | 0.4 |
| Biocide[7] | 0.8 | 0.8 | 0.8 | 0.8 |
| Thickener[8] | 1.2 | 1.2 | 1.2 | 1.2 |
| Water | 29.5 | 18.1 | 30.0 | 27.4 |

The paint formulations F1 to F8 prepared freshly as described above were first left to stand at room temperature for 2 days. They were then filtered through a 125 μm filter while applying a vacuum in order to remove air bubbles and possible pigment agglomerates. The filtered paints were subsequently used for the test investigations and coating applications.

b) Performance Investigations

The fracture-mechanical properties of the paint films obtainable from paint formulations F1 to F8 were determined in the tensile test according to DIN 53504. The thickness of the paint films was 0.4-0.5 mm and the pulling speed was 25.4 mm/min. Before the investigations were begun, the paint formulations were applied to a Teflon support and stored for 14 days in a controlled-climate chamber at 23° C. and 50% relative humidity for the paint films to form. The values specified in the table below are in each case the mean values from 5 separate measurements in each case.

| Paint formulation | Tensile strength TS (N/mm$^2$) | Elongation at break EB (%) | Toughness (TS × EB) |
|---|---|---|---|
| F1 | 2.1 | 823 | 1728 |
| F2 | 2.0 | 622 | 1244 |
| F3 | 1.9 | 566 | 1075 |
| F4 | 1.8 | 452 | 814 |
| F5 | 4.6 | 337 | 1550 |
| F6 | 4.7 | 410 | 1927 |
| F7 | 4.2 | 330 | 1386 |
| F8 | 3.7 | 238 | 881 |

As is clearly evident from the results listed in the table, the films formed from the inventive paint formulations F1, F2, F5, and F6 have not only increased tensile strength but also an increased elongation at break and, in particular, an increased film toughness as compared with the films formed from the respective comparative formulations F3 and F4 and also F7 and F8.

We claim:

1. An aqueous synthetic resin formulation, comprising:
   A) from 3 to 75% by weight of at least one synthetic resin, denoted as resin A comprising
      a) from 50 to 99.9% by weight of at least one ester of α,β-monoethylenically unsaturated carboxylic acids having 3 to 6 carbon atoms and alkanols having 1 to 18 carbon atoms or of at least one vinyl ester of an aliphatic monocarboxylic acid having 2 to 8 carbon atoms, or of a mixture of thereof, denoted as monomers a,
      b) from 0.1 to 12% by weight of at least one α,β-monoethylenically unsaturated monobasic or dibasic acid having 3 to 8 carbon atoms, or anhydrides thereof, or of a mixture thereof, denoted as monomers b,
      c) from 0 to 10% by weight of one or more monoethylenically unsaturated acetophenone derivatives or benzophenone derivatives, or of a mixture of thereof, denoted as monomers c, and
      d) from 0 to 50% by weight of one or more other copolymerizable monoethylenically unsaturated monomers, denoted as monomers d, in copolymerized form,
   the weight fractions of the monomers a, b, and d being selected within the stated limits such that a synthetic resin consisting of the monomers a, b and d would have a glass transition temperature ranging from −50 to +40° C.;
   B) at least one metallic cation with a charge number ranging from 2 to 4 in water-soluble form to neutralize from 0.2 to 6 times the amount of its conjugate bases that corresponds to the amount of acid functions incorporated into the synthetic resin A in the form of the monomers b, denoted as component B;
   C) from 0 to 10% by weight, based on the resin A, of benzophenone or acetophenone or of one or more acetophenone derivatives or benzophenone derivatives which are not monoethylenically unsaturated, or of a mixture of these active substances, denoted as component C;

D) a dispersant;

E) at least 5% by weight of water; and

F) from 0 to 85% by weight of finely divided fillers, denoted as filler F, wherein the resin A is prepared by free-radically initiated aqueous emulsion polymerization of the monomers a to d in the presence of from 0.01 to 3 parts by weight of an alien polymer seed, based on 100 parts by weight of the mixture of the monomers a to d.

2. The formulation as claimed in claim 1, wherein the alien polymer seed is in the form of an aqueous polymer dispersion.

3. The formulation as claimed in claim 1, wherein all of the alien polymer seed is introduced before the polymerization reaction.

4. The formulation as claimed in claim 1, wherein the weight-average diameter of the alien polymer seed particles is less than or equal to 100 nm.

5. The formulation as claimed in claim 4, wherein the weight-average diameter of the alien polymer seed particles is ranges from 5 nm to 50 nm.

6. The formulation as claimed in claim 1, wherein the polymer of the alien polymer seed has a glass transition temperature greater than or equal to 50° C.

7. The formulation as claimed in claim 1, wherein the alien polymer seed is a polystyrene or polymethyl methacrylate polymer seed.

8. The formulation as claimed in claim 1, wherein resin A consisting only of the monomers a, b, and d copolymerized in amounts such that a synthetic resin consisting only of the monomers a, b, and d would have a glass transition temperature ranging from −40° C. to 0° C.

9. A formulation as claimed in claim 1, comprising calcium (II) ions as the metallic cation.

10. A method for coating, adhesive bonding, sealing or impregnating, which comprises:

applying the aqueous synthetic resin as claimed in claim 1 to a substrate.

11. A paint, which comprises:

the aqueous synthetic resin as claimed in claim 1 and a pigment.

12. A method of painting, which comprises:

applying the paint as claimed in claim 11 to a substrate.

* * * * *